(12) United States Patent
Yasuda et al.

(10) Patent No.: US 6,373,905 B1
(45) Date of Patent: Apr. 16, 2002

(54) DECODING APPARATUS AND DECODING METHOD

(75) Inventors: Makoto Yasuda, Nagaokakyo; Shintaro Nakatani, Amagasaki, both of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/248,116

(22) Filed: Feb. 11, 1999

(30) Foreign Application Priority Data

Feb. 13, 1998 (JP) .......................... 10-031518

(51) Int. Cl.[7] .................. H03D 1/00; G06K 9/36; H03M 7/00
(52) U.S. Cl. .................. 375/340; 382/245; 341/59
(58) Field of Search .................. 375/340, 316, 375/246, 253, 324; 382/245, 246; 341/59

(56) References Cited

U.S. PATENT DOCUMENTS 5,767,799 A * 6/1998 Maertens et al. ............. 341/67
6,052,415 A * 4/2000 Carr et al. ............. 375/240.12
6,175,592 B1 * 1/2001 Kim et al. ................. 348/441

FOREIGN PATENT DOCUMENTS

JP 09271025 10/1997

* cited by examiner

Primary Examiner—Chi Pham
Assistant Examiner—Khai Tran
(74) Attorney, Agent, or Firm—Wenderoth, Lind & Ponack, L.L.P.

(57) ABSTRACT

A decoding apparatus comprises: decoding means which receives a first code sequence of a hierarchical structure as an input, decodes a code sequence of a selected first layer and higher layers in the first code sequence, outputs a detection signal when an error is detected while the code sequence is being decoded, and detects a second code sequence indicating the start of the first layer and higher layers in a set code sequence parsing position of the first sequence; and means for setting a code sequence parsing position which receives the detection signal and sets the parsing position of the code sequence in such a way that code sequence parsing performed by the decoding means is returned from a point at which code sequence parsing is being performed to a point at which code sequence parsing has been performed in the first code sequence.

6 Claims, 12 Drawing Sheets

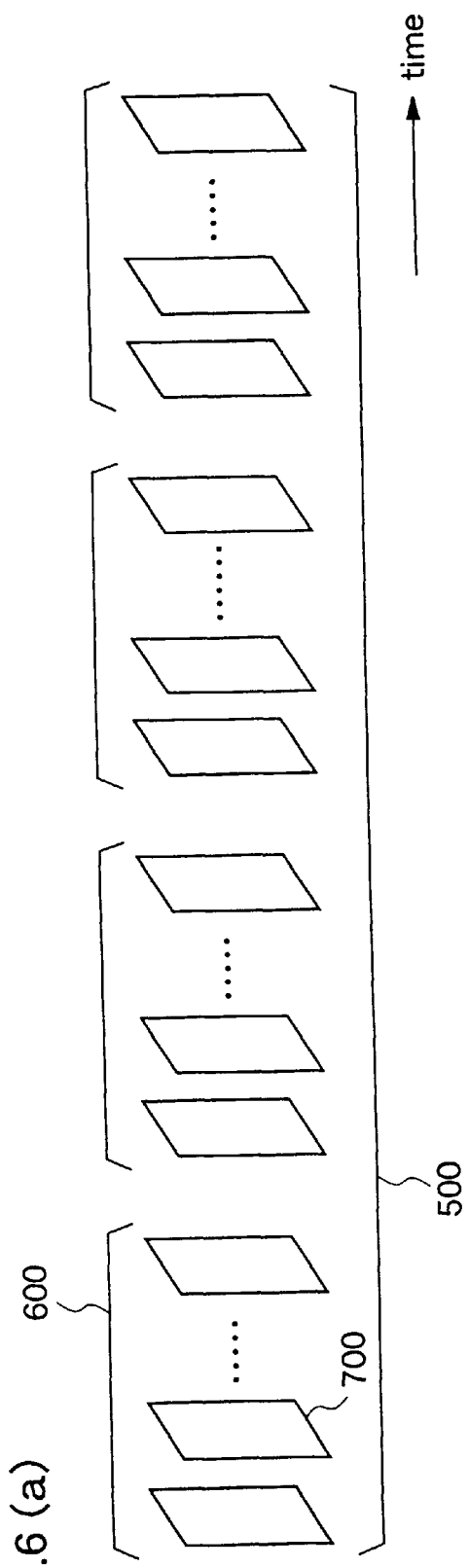
Fig.6 (a) PRIOR ART
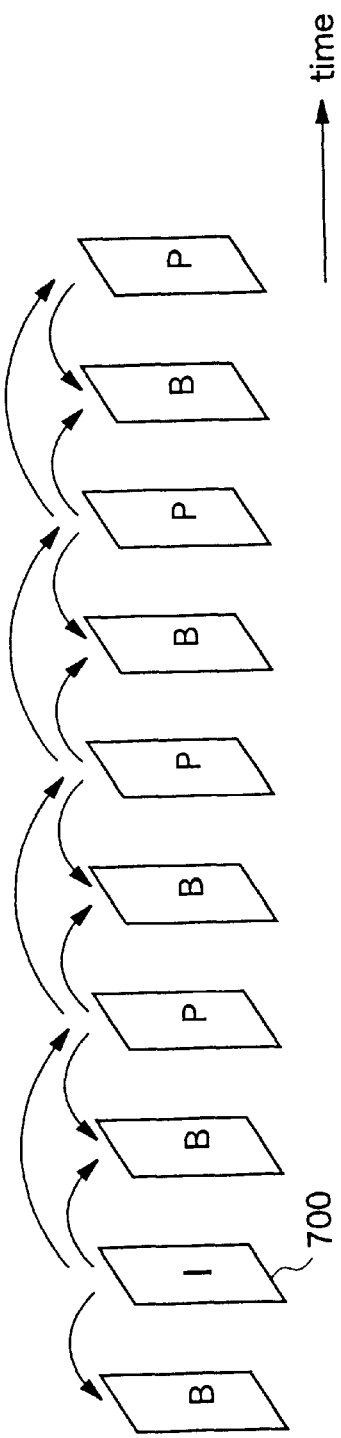
Fig.6 (b) PRIOR ART

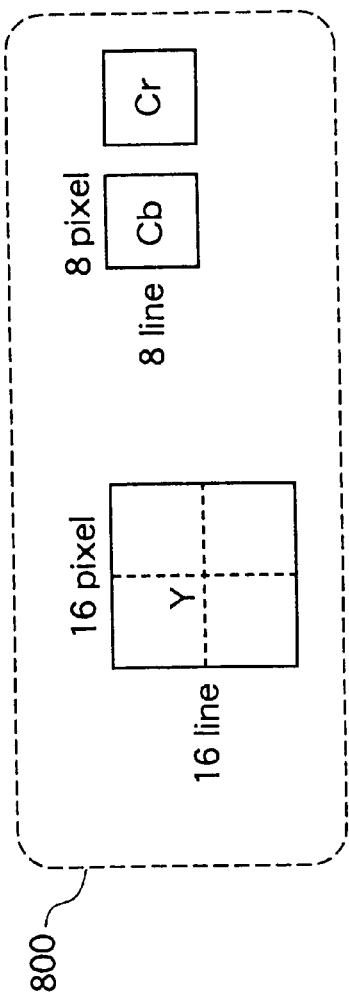
Fig.7 (b) PRIOR ART
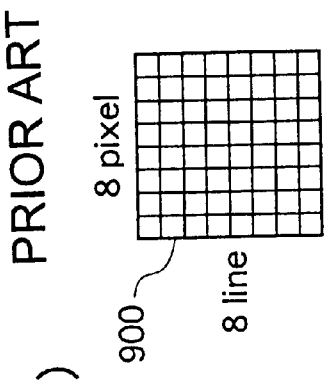
Fig.7 (c) PRIOR ART
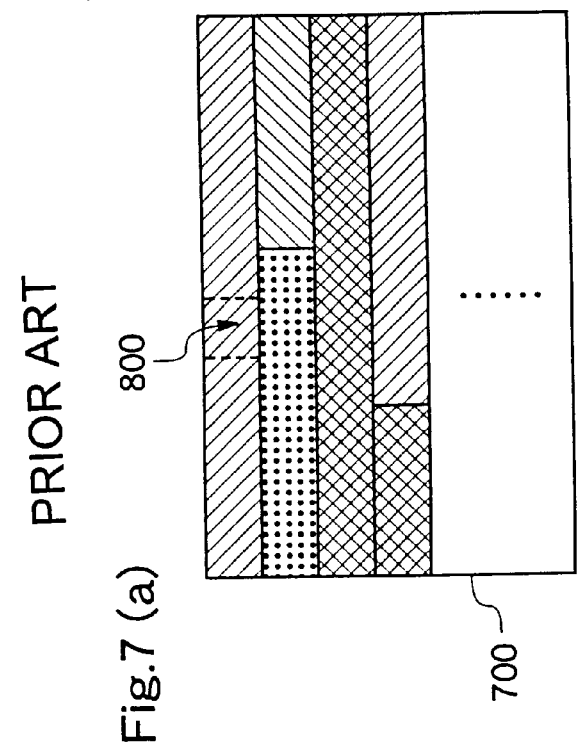
Fig.7 (a) PRIOR ART

Fig.12  PRIOR ART

| variable length code | meaning of code (run, level) |
|---|---|
| 10 | EOB(end of coefficient in the block) |
| 011 s | ( 1, 1 ) |
| 0100 s | ( 0, 2 ) |
| 0101 s | ( 2, 1 ) |
| 0010 1 s | ( 0, 3 ) |
| 0011 1 s | ( 3, 1 ) |
| 0011 0 s | ( 4, 1 ) |
| ⋮ | ⋮ |
| 0000 100 s | ( 2, 2 ) |
| ⋮ | ⋮ |
| 0000 0000 0001 1100 s | ( 30, 1 ) |
| 0000 0000 0001 1011 s | ( 31, 1 ) | s : a sign of level

DECODING APPARATUS AND DECODING METHOD

FIELD OF THE INVENTION

The present invention relates to a decoding apparatus and a decoding method for use in a process for reproducing a moving picture stored in a storage device.

BACKGROUND OF THE INVENTION

In recent years, as an information society greatly advances, a demand for sending moving pictures to other people beyond time and places goes on increasing. In response to this demand, it became possible to record and reproduce the moving pictures by the use of a recording apparatus or transmit them via a communication network over a long distance. A digital technology is employed to transmit/store these information in communication. Also, a coding method using the digital technology is adopted in broadcasting.

For recording a moving picture or an audio signal in a digital format (digital signal), a digital recording medium of a large capacity is used. As available digital recording media, there are a video CD (Compact Disc) which has digital moving pictures recorded in a CD, and a DVD which contains higher-quality and longer digital moving pictures than that recorded in the video CD.

However, these digital recording media do not have storage capacities sufficient to record the moving picture for a long time period. It is therefore essential that a technique for coding the digital signal efficiently (compressing data) be employed in order to transmit and record the moving picture or the audio signal efficiently.

The technique for coding the moving picture or the audio signal has been developed. Currently, methods according to an international standard relating to "Information Technology—Coding of moving pictures and associated audio for digital storage media at up to about 1.5 Mbits/s (ISO/IEC11172-2)" are used. The international standard is termed "MPEG" (Moving Picture Experts Group).

A description will be given of a method for coding a digital moving picture and a bitstream according to MPEG.

FIG. 6(a) shows the digital moving picture according to MPEG. A video frame group 500 called "sequence" comprising a series of video frames 700 is coded. The sequence is commonly divided into a series of video frame groups 600, each of which is called a group of pictures (GOP) of about 0.5 second.

FIG. 6(b) shows an example of the GOP. As shown in FIG. 6(b), the GOP is composed of I pictures, P pictures, and B pictures. The I picture is obtained by independently coding data corresponding to a video frame, (the data is coded entirely by itself), and called an "intra-picture". The P picture is predicted from a temporally previous (forward) frame (I picture or P picture) and is called a "forward predictive picture". The B picture is predicted from temporally previous and subsequent (forward and backward) frames (I or P pictures), that is, by interpolation between previous and subsequent I or P pictures, and is called a "bidirectionally Predictive Picture".

FIG. 7(a) shows a structure of each picture. Each picture comprises a series of band-shaped regions on a frame which are called "slices" (one or more slices). Each slice comprises one or more "macroblocks" each composed of (16×16) pixels.

FIG. 7(b) shows an example of a macroblock 800. The macroblock 800 comprise a plurality of image blocks each composed of (8×8) pixels shown in FIG. 7(c). The macroblock shown in FIG. 7(b) comprises 4 blocks corresponding to a luminance signal Y, and 2 blocks corresponding to chrominance signals Cb and Cr. The chrominance signals Cb and Cr each comprises pixels sampled from an original image at a resolution as half as a resolution at which pixels are sampled therefrom to form the luminance signal Y.

In the above hierarchical (layered) structure, sequences, GOPs, pictures, and slices as upper layers are respectively provided with headers each containing hierarchy information. Each header comprises a code sequence called a start code comprising "0s" of 23 bits or more and the following "1" of 1 bit which are uniquely identifiable on a bitstream, coding information about each layer, extension indicating information about extension from MPEG to MPEG2 (Information Technology—Generic coding of moving pictures and associated audio for digital information (ISO/IEC13818-2), and the like.

FIG. 8 shows an example of a structure of the bitstream. Turning to FIG. 8, in the macroblock (lower) layer, various types of image coding information is shown. From the head, aligned are a macroblock address increment indicating a distance from a previously (most recently) coded macroblock with respect to a two-dimensional point in a picture, a macroblock type indicating coding mode information about a macroblock type indicating coding mode information about a macroblock to be coded, a quantiser scale indicating a quantisation scale, motion vectors for use in motion compensation, a coded block pattern indicating which coded block data is present in the bitstream, coded DCT (Discrete Cosine Transform) coefficient data, and the like.

Each of these data is represented as a variable length code. To data appearing more frequently, a code of shorter length is assigned. Thereby, these data which occupies most of the bitstream is efficiently coded.

To be specific, the bitstream comprising the sequence (lower) layer is, as shown in FIG. 9, divided in units of fixed length, and stored in the payloads of packets. To each of these payloads, added is a packet header composed of fields such as a packet start code, a stream identifier (ID), a packet length, a PTS (Presentation Time Stamp), a DTS (Decoding Time Stamp), and the like. These packets are multiplexed to create the bitstream.

The data so coded is stored in the digital recording medium such as the video CD or the DVD and then processed by a decoding apparatus, to reproduce a moving picture.

It is essential that the decoding apparatus using the digital storage medium have a capability of reproducing moving pictures in the order as recorded and a capability of performing trick play including fast forward playback and fast rewind playback. Hereinafter, a description will be given of a method for playing back the bitstream by the fast forward playback or the fast rewind playback.

In a normal playback process, all the pictures included in the bitstream are decoded and displayed, while in the fast forward playback process, an image is displayed by any of the following methods. One method is to transfer the bitstream recorded in the digital storage medium to the decoding apparatus, which decodes only the T pictures to be displayed. The other method is to selectively transfer packets containing I picture information from the digital storage medium to the decoding apparatus, which decodes the I pictures to be displayed.

In actuality, there are drawbacks with the use of the former method, including lack of the decoding apparatus's ability to analyze the bitstream and complicated selection of the I pictures, and therefore, the latter method is commonly used for the fast forward playback process. For instance, when the decoding apparatus reproduces the pictures according to the former method, assuming that the speed of the fast forward playback process is 100 times as high as that of the normal playback process, it requires an ability to analyze the bitstream 100 times as high as that of the decoding apparatus in the normal playback process. Hence, a general decoding apparatus does not satisfy such performance requirements.

Subsequently, a description will be given of the latter decoding method with reference to FIGS. 10(a)–10(c). FIG. 10(a) shows a bitstream on the digital storage medium. FIG. 10(b) shows parts of the bitstream 300, 310, and 320, each comprising packets containing I picture information. FIG. 10(c) is a bitstream (elementary stream) comprising data contained in payloads of the parts of the bitstream 300, 310, 320, . . . .

In the fast forward playback process, the entire bitstream is not supplied to the decoding apparatus but the parts of the bitstream 300, 310, 310, . . . , are sequentially supplied thereto, and the I pictures contained therein are sequentially reproduced.

In the fast rewind playback process, the parts of the bitstream to be supplied to the decoding apparatus are transferred reversely in temporal direction. Specifically, the parts 320, 310, 300, . . . shown in FIG. 10(b) are supplied to the decoding apparatus to be decoded in this order.

In this case, the packet containing the first I picture included in the GOP shown in FIG. 10(a) can be often specified according to management information recorded on a disc, and hence the parts of the bitstream are selectively supplied to the decoding apparatus with ease as intended.

In the fast forward playback process or the fast rewind playback process performed by the above decoding apparatus, discontinuous parts of the bitstream are supplied to the decoding apparatus and a part containing incomplete picture data are connected to the following part. As a consequence, data different from original data is decoded.

To be specific, in the connected portions, a code is parsed incorrectly, which causes a degraded image different from an original image to be reproduced. An error at a connection point is detected, because data in the following portion is parsed in a manner different from that as expected and thereby it is recognized that undefined data has appeared. At the detection of the error, the code parsing has been performed incorrectly for the following part of the bitstream connected to this point, and thereby the image different from the original image is reproduced. Although the part of the bitstream has been selected, the original image is not reproduced and displayed.

On specific example of this will be described.

Turning to FIG. 10(c) again, the bitstream (elementary stream) is illustrated, which is supplied to the decoding apparatus at the fast forward playback process. Picture data contained in the part of the bitstream placed just before a connection point "A" is incomplete. Just after the connection point "A", placed is an I picture header for identifying the following I picture.

FIG. 11 shows a bitstream 80 just before and after the connection point A. At the connection point A, connected are DCT coefficient data, i.e., data lower than a macroblock N indicating an I picture to be reproduced and displayed and a picture header for identifying a subsequent I picture.

FIG. 12 shows an example of a code sequence (variable length codes) representing DCT coefficients according to MPEG. As shown in FIG. 12, data lower than the macroblock layer such as the DCT coefficients is represented as variable length codes. For an input bitstream, the variable length codes are decoded and then pictures are decoded.

In the fast forward playback process, packets containing information about required I pictures are selected, and then parts of the bitstream 300, 310, 320, . . . , are sequentially connected to create the bitstream shown in FIG. 10(C). In the part of the bitstream 300 placed just before the connection point A, the DCT coefficient data is incomplete. In this case, although original DCT coefficient data contains a code sequence "0000 1001 (run2, level-2)", a code sequence of the picture header follows the middle of the original DCT coefficient data, and thereby "0000 1000 (run 2, level 2) is parsed as shown by a code sequence 83. As a consequence, an image different from an original image is decoded, causing a serious degradation in the quality of a reproduced image.

The following part 310 starts with a start code of the picture header, the start code comprising "0s" of 23 bits or more and the following "1" of 1 bit. However, as a result of incorrect parsing of the DCT coefficient data as shown by the code sequence 83, the following start code is parsed incorrectly, and it is decided that it contains the remaining portion of the DCT coefficient data of a block n+1 as shown by a code sequence 85. If the code sequence 85 is not a variable length code defined according to MPEG, an error is detected in a decoding process. Even if the error might not be detected just after the connection point but the appearance or the order of the headers does not conform to a rule, an error occurs and is detected. When the error is detected, it is decided that data being decoded is ineffective, and the header of the following I picture is searched and a code sequence at a point (a point B) shown in FIG. 10(c) is decoded. Although the I picture contained in the part 310 has been selected and supplied to the decoding apparatus, an image corresponding to the I picture is not reproduced and displayed.

SUMMARY OF THE INVENTION

It is an object of the present invention to provide a decoding apparatus and a decoding method which are capable of decoding a code sequence to obtain complete information with the use of data being decoded even if an error is detected in a process for decoding a bitstream of a layered (hierarchical) structure.

Other objects and advantages of the invention will become apparent from the detailed description that follows. The detailed description and specific embodiments described are provided only for illustration since various additions and modifications within the spirit and the scope of the invention will be apparent to those skill in the art from the detailed description.

According to a first aspect of the present invention, a decoding apparatus comprises: decoding means which receives a first code sequence of a hierarchical structure as an input, decodes a code sequence of a selected first layer and higher layers in the first code sequence, outputs a detection signal when an error is detected while the code sequence is being decoded, and detects a second code sequence indicating the start of the first layer and higher layers in a set code sequence parsing position of the first code sequence; and means for setting a code sequence parsing position which receives the detection signal and sets the parsing position of the code sequence in such a way that code sequence parsing performed by the decoding means is returned from a point where code sequence parsing is being performed to a point where code sequence parsing has been performed in the first code sequence. Therefore, serious degradation in the quality of a reproduced image caused by an error occurring in a selected code sequence, can be avoided.

According to a second aspect of the present invention, in the decoding apparatus of the first aspect, the decoding means nullifies decoded data of the first layer being decoded and lower layers, after detecting the second code sequence. Therefore, serious degradation in the quality of a reproduced image caused by an error occurring in a selected code sequence, can be avoided. Besides, pictures selectively supplied to the decoding apparatus can be reproduced with reliability.

According to a third aspect of the present invention, in the decoding apparatus of the first aspect, the decoding means, after detecting the second code sequence, performs a predetermined process for data which is being decoded and will be obtained by decoding a code sequence of a layer lower than the first layer which will appear in the first code sequence, based on decoded data, in order to complete data of the layer lower than the first layer. Therefore, serious degradation in the quality of a reproduced image caused by an error occurring in a selected code sequence, can be avoided. Besides, an image in which an error has occurred can be reproduced with reliability.

According to a fourth aspect of the present invention, a decoding method comprises: a decoding step which receives a first code sequence of a hierarchical structure as an input, and decodes a code sequence of a selected first layer and higher layers in the first code sequence, wherein a parsing position of a code sequence is set in such a way that code sequence parsing is returned from a point where code sequence parsing is being performed to a point where code sequence parsing has been performed in the first code sequence, and a second code sequence indicating the start of the first layer and higher layers is detected in the set parsing position of the first code sequence, when the error is detected while the code sequence is being decoded. Therefore, serious degradation in the quality of a reproduced image caused by an error occurring in a selected code sequence, can be avoided.

According to a fifth aspect of the present invention, in the decoding method of the fourth aspect, the decoding step nullifies decoded data of the first layer being decoded and lower layers, after detecting the second code sequence. Therefore, serious degradation in the quality of a reproduced image caused by an error occurring in a selected code sequence, can be avoided. Besides, pictures selectively supplied to the decoding apparatus can be reproduced with reliability.

According to a sixth aspect of the present invention, in the decoding method of the fourth aspect, the decoding step, after detecting the second code sequence, performs a predetermined process for data which is being decoded and will be obtained by decoding a code sequence of a layer lower than the first layer which will appear in the first code sequence, based on decoded data, in order to complete data of the layer lower than the first layer. Therefore, serious degradation in the quality of a reproduced image caused by an error occurring in a selected code sequence, can be avoided. Besides, an image in which an error has occurred can be reproduced with reliability.

BRIEF DESCRIPTION OF THE DRAWINGS

FIG. 6 is a diagram for explaining a method for coding data of a picture layer and higher in a digital moving picture according to MPEG.

FIG. 7 is a diagram for explaining a method for coding data lower than a slice data in the digital moving picture according to MPEG.

FIG. 12 is a diagram showing an example of variable length codes of DCT coefficients according to MPEG.

DETAILED DESCRIPTION OF PREFERRED EMBODIMENTS

Now, a description will be given of preferred embodiments.

Figure 10:
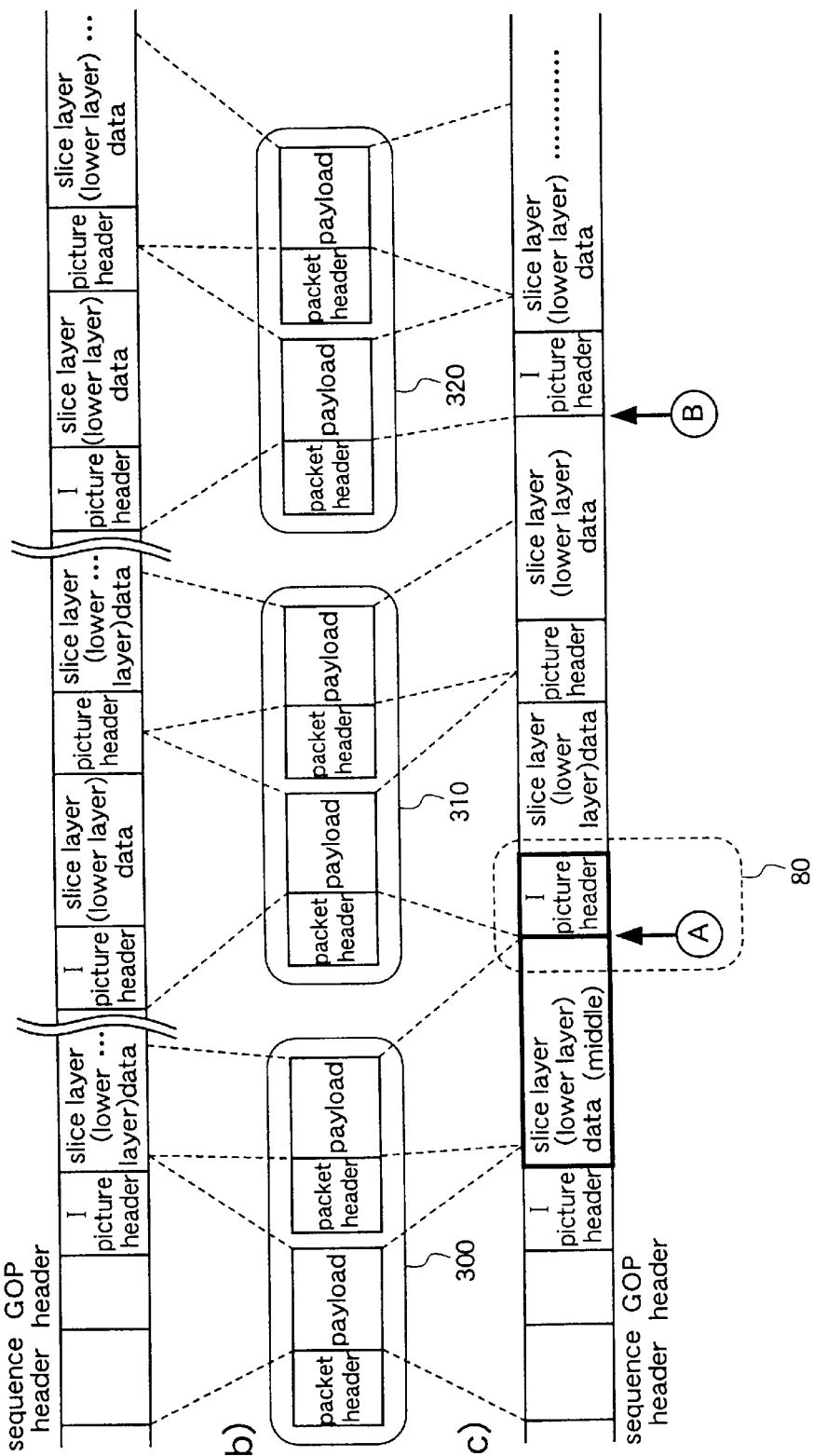
FIG. 10 is a diagram showing a structure of an elementary stream comprising parts of the bitstream which is processed in trick play.
Figure 11:
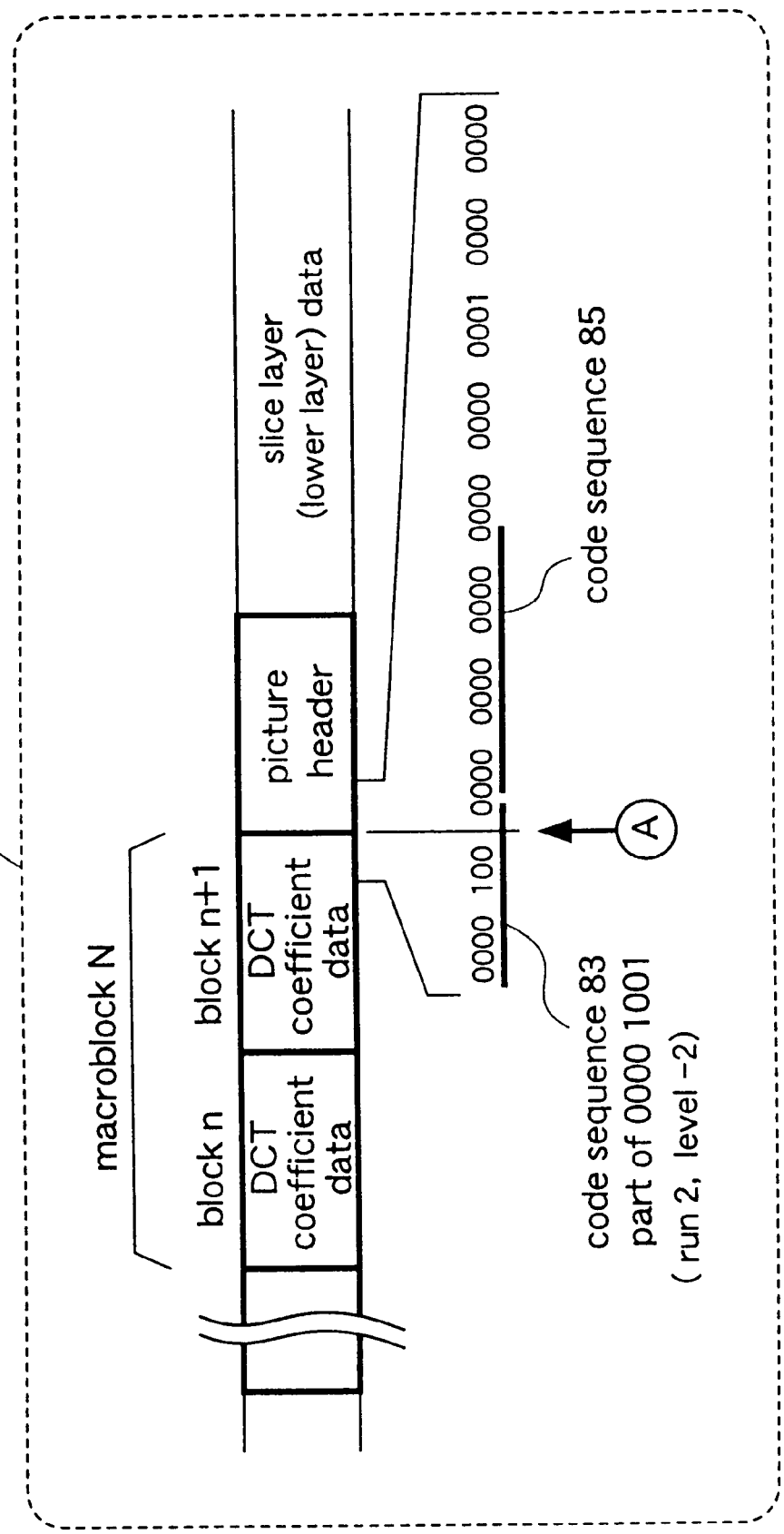
FIG. 11 is a diagram showing a detailed structure of parts of the bitstream around the connection point in the elementary stream.

In preferred embodiments of the present invention, in a trick play process including a fast forward playback process or a fast rewind playback process, the entire bitstream is not supplied to a decoding apparatus but the parts of the bitstream 300, 310, and 320 shown in FIG. 10(*b*) are sequentially supplied thereto and I picture data contained therein is decoded to provide a reproduced image.

In the trick play process, the elementary stream comprising connected parts of the bitstream shown in FIG. 10(*c*) is supplied to the decoding apparatus, and hence a syntactically correct code sequence defined according to MPEG is not always input thereto. In some cases, therefore, the code sequence at the connection point 80 is parsed incorrectly. Due to this incorrect parsing, an image corresponding to an I picture to be reproduced cannot be reproduced, and thereby the quality of a reproduced image is seriously degraded.

Embodiment 1.

Figure 1:
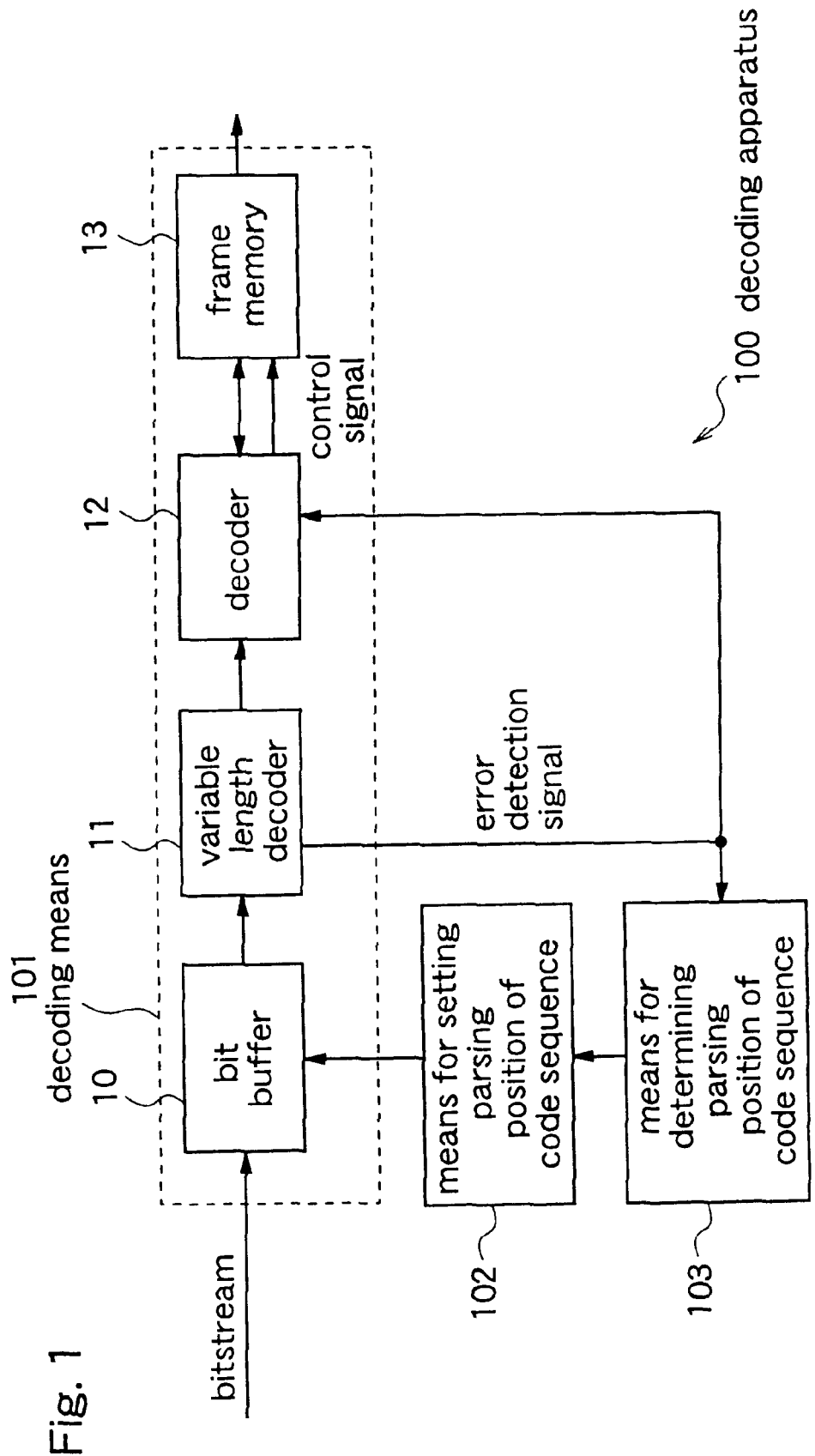
FIG. 1 is a block diagram showing a decoding apparatus according to a first embodiment of the present invention.

FIG. 1 shows construction of a decoding apparatus 100 of the first embodiment.

The decoding apparatus 100 includes decoding means 101 for decoding a code sequence of the input elementary stream, means (determination means) 103 for determining the parsing position of the code sequence in such a way that code sequence parsing is returned to a point a predetermined bits before a current parsing point, and means (setting means) 102 for setting the parsing position of the code sequence in the elementary stream according to a signal output from the determination means 103.

The decoding means 101 comprises a bit buffer 10 for storing the bitstream, a variable length decoder 11 for performing variable length decoding to the code sequence output from the bit buffer 10, a decoder 12 for decoding the variable length decoded code sequence, and a frame memory 13 for storing the decoded data.

The variable length decoder 11 has a capability of detecting an error occurring at the connection point of the parts of the bitstream composing the elementary stream. When the decoder 11 has detected the error, it is adapted to output an error detection signal to the decoder 12 and the determination means 103. To be specific, when the decoder 11 has detected the variable length code undefined in MPEG as shown in FIG. 12, as a result of incorrect parsing at the connection point 80, the decoder 11 is adapted to output the error detection signal and then searches a start code.

Receiving the error detection signal, the decoder 12 is adapted to output a control signal in accordance with which decoded data stored in the frame memory 13 will not be displayed. The frame memory 13 has plural areas for storing frame display information and frame data (decoded data). The frame display information is contained in each frame data and includes information indicating whether or not the corresponding frame data will be displayed.

Subsequently, operation will be described.

Figure 2:
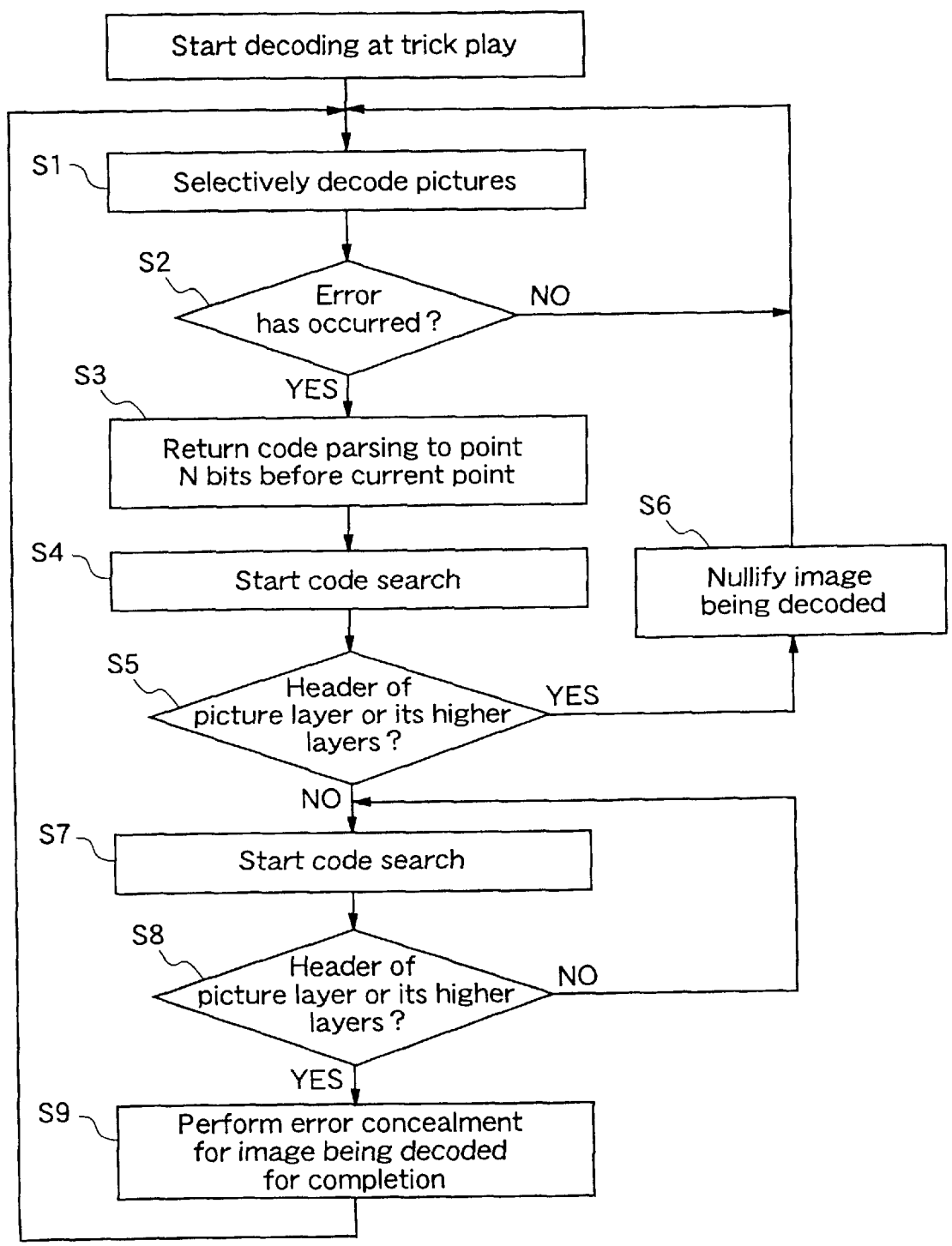
FIG. 2 is a flowchart showing a decoding method of the first embodiment.

FIG. 2 shows a flowchart showing operation of the first embodiment. Along flow in FIG. 2, the elementary stream supplied at the trick play process is first stored in the bit buffer 10 and then only the I pictures are selectively variable length decoded by the variable length decoder 11 (Step S1). It is checked whether or not the variable length code undefined in MPEG has occurred (the error has occurred), that is, whether or not incorrect parsing of a code has been performed at the connection point of the bitstream (Step S2).

When there occurred no error, the variable length decoder 11 performs continued variable length decoding, whereas when the error has occurred, the decoder 11 outputs the error detection signal to the determination means 103. Receiving the error detection signal, the determination means 103 directs the setting means 102 to set the parsing position to a point "N" bits before the current parsing point in the elementary stream where variable length decoding is being performed (Step S3). The number of bits "N" is a preset fixed value. The setting means 102 directs the bit buffer 10 to return an address of a read pointer to point address which corresponds to "N" bits before the current point. The bit buffer 10 outputs the elementary stream from the resulting address to the variable length decoder 11, which searches the corresponding start code (Step S4).

At this time, the variable length decoder 11 decides whether or not the found start code indicates the header of the picture layer or its higher layers (the picture layer or layers higher than the picture layer) (Step S5).

When the found code indicates the header of the picture layer and its higher layers, the decoder 12 aborts decoding and outputs the control signal for nullifying the I picture image whose code has been parsed incorrectly and is stored in the frame memory 13. Thereby, the nullified I picture image is not displayed. Instead, the I picture including the found start code (header) is decoded and the resulting image is displayed.

When an elementary stream is a correct bitstream according to MPEG, the found start code would indicate the header of the picture layer or its higher layers. If the bitstream contains an error, the start code of the picture layer or its higher layers might not be always found. For instance, when the found start code is the start code indicating a slice layer lower than the picture layer, the variable length decoder 11 further searches a start code (Step S7), to decide whether or not the start code indicates the header of the picture layer or its higher layers (Step S8). If yes, the image being decoded is completed by an error concealment process and displayed (Step S9). Then, Step S1 is performed again.

Figure 5:
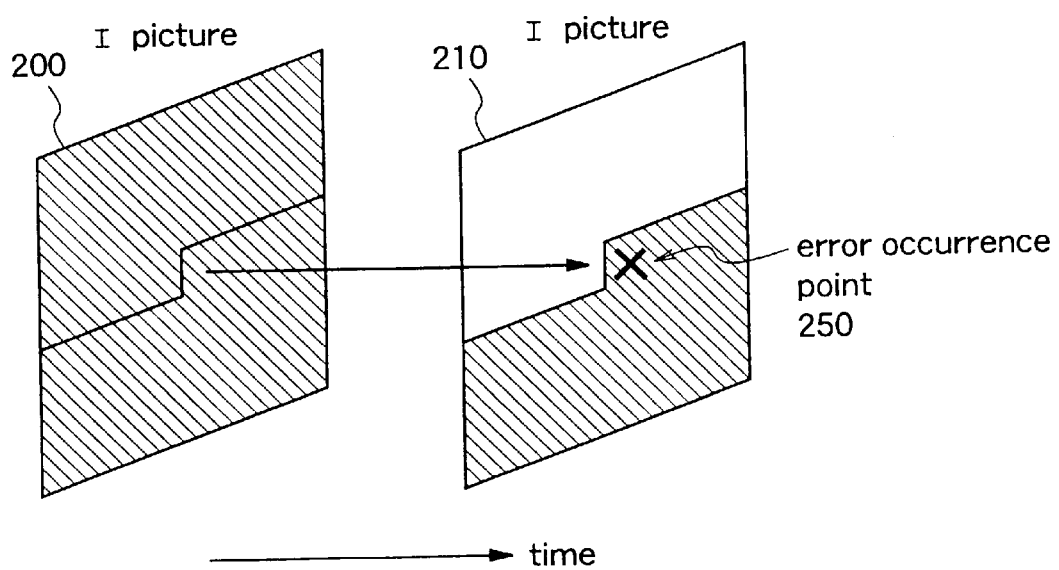
FIG. 5 is a diagram for explaining an error concealment process of the second embodiment.
Figure 8:
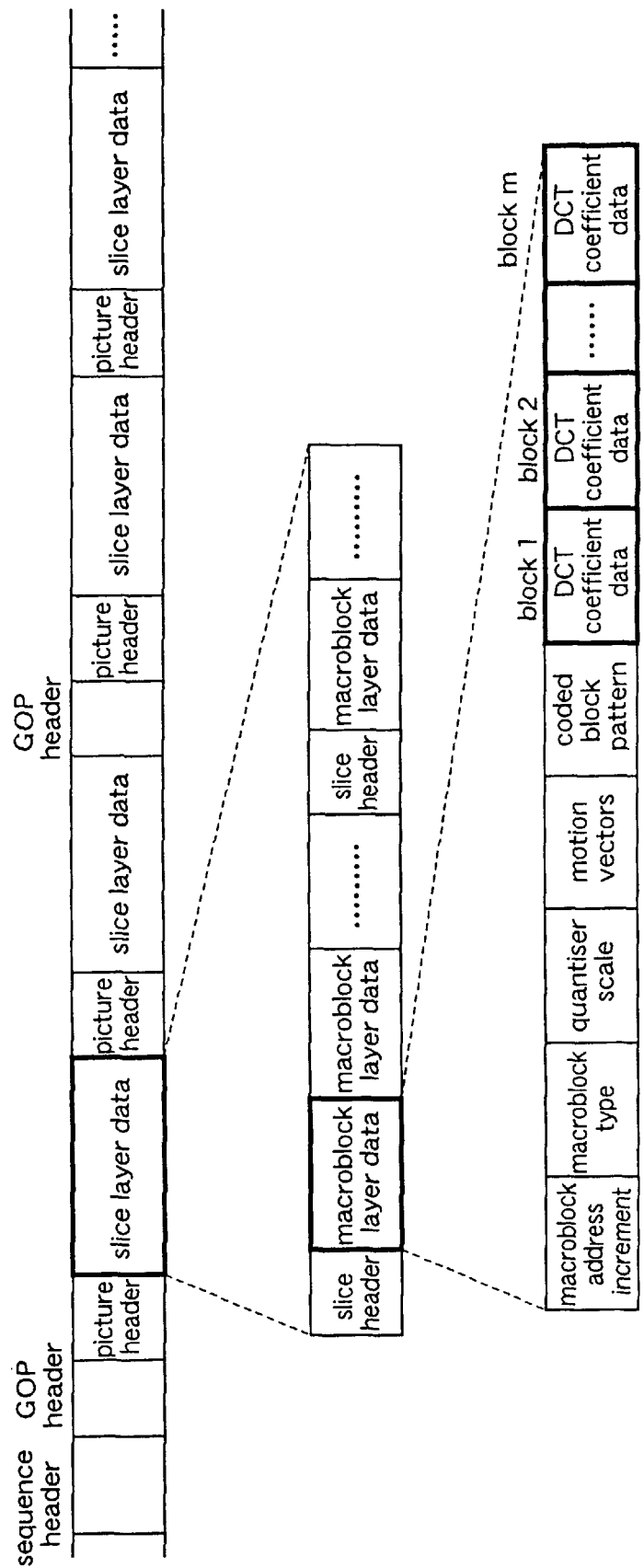
FIG. 8 is a diagram showing a structure of a bitstream according to MPEG.
Figure 9:
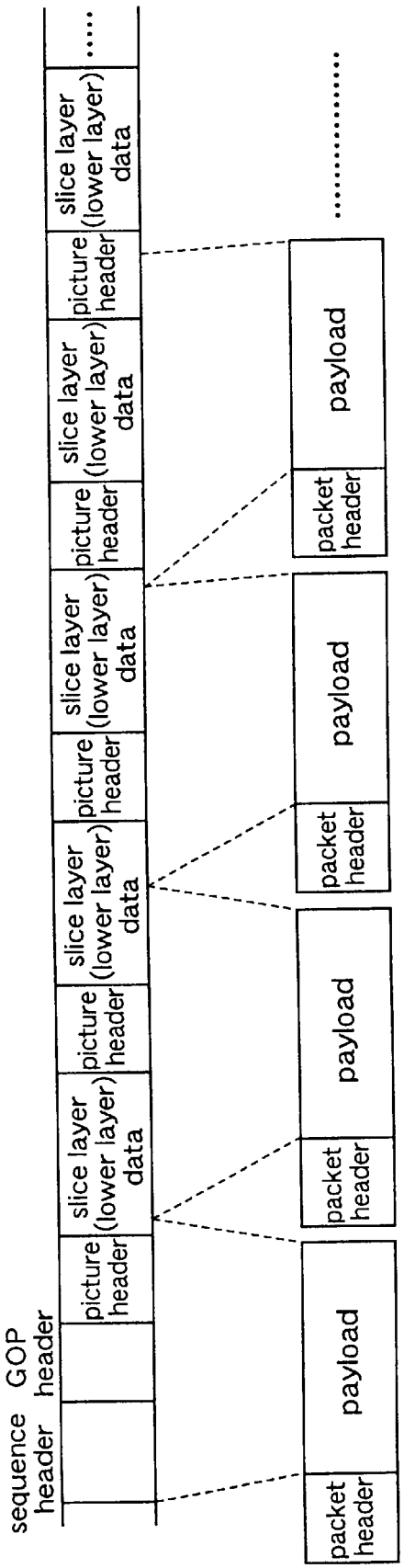
FIG. 9 is a diagram showing packetization of the bitstream.

The error concealment process is to compensate for an image region lost due to the error by the use of compensation means. FIG. 5 shows an example of this error concealment process for a case where an error occurs while an I picture 210 is being decoded. The I picture 210 being decoded loses an image region after an error occurrence point 250, into which an image corresponding to the image region in an I picture 200 which has been previously (most recently) decoded is fitted. In this case, the image of the previous I picture 200 may be fitted into the lost image region or may be subjected to a motion compensation process for each macroblock and then fitted into it.

Thus, in accordance with the first embodiment, the error of code parsing occurred at the connection point of the parts of the bitstream composing the elementary stream is detected, the start code of the picture layer and its higher layers before the point where decoding is being performed is searched, and then the data of the picture layer and its higher layers is decoded and the image in which the error has occurred is nullified. Therefore, serious degradation in the quality of the image can be avoided and simultaneously the elementary stream supplied to the decoding apparatus can be decoded correctly.

Embodiment 2.

Figure 3:
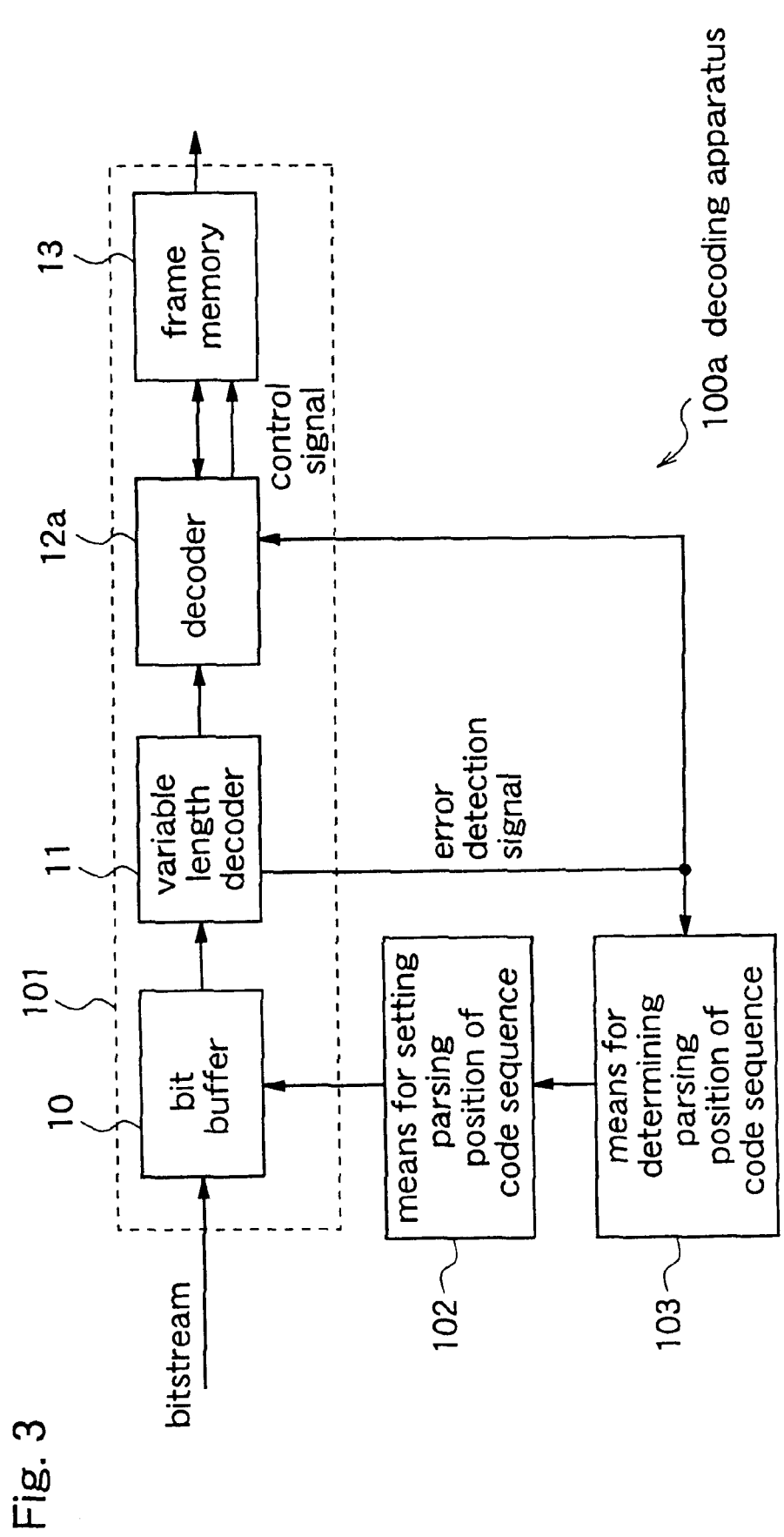
FIG. 3 is a block diagram showing a decoding apparatus according to a second embodiment of the present invention.

FIG. 3 shows a decoding apparatus according to a second embodiment of the present invention. Shown in FIG. 2 is a decoding apparatus 100a.

The decoding apparatus 100a is constructed in the same manner as the decoding apparatus 100 except that the apparatus 100a includes a decoder 12a which has an error concealment capability of compensating for the portion following an error occurrence point in data being decoded.

Operation of the decoding apparatus 100a will be described.

Figure 4:
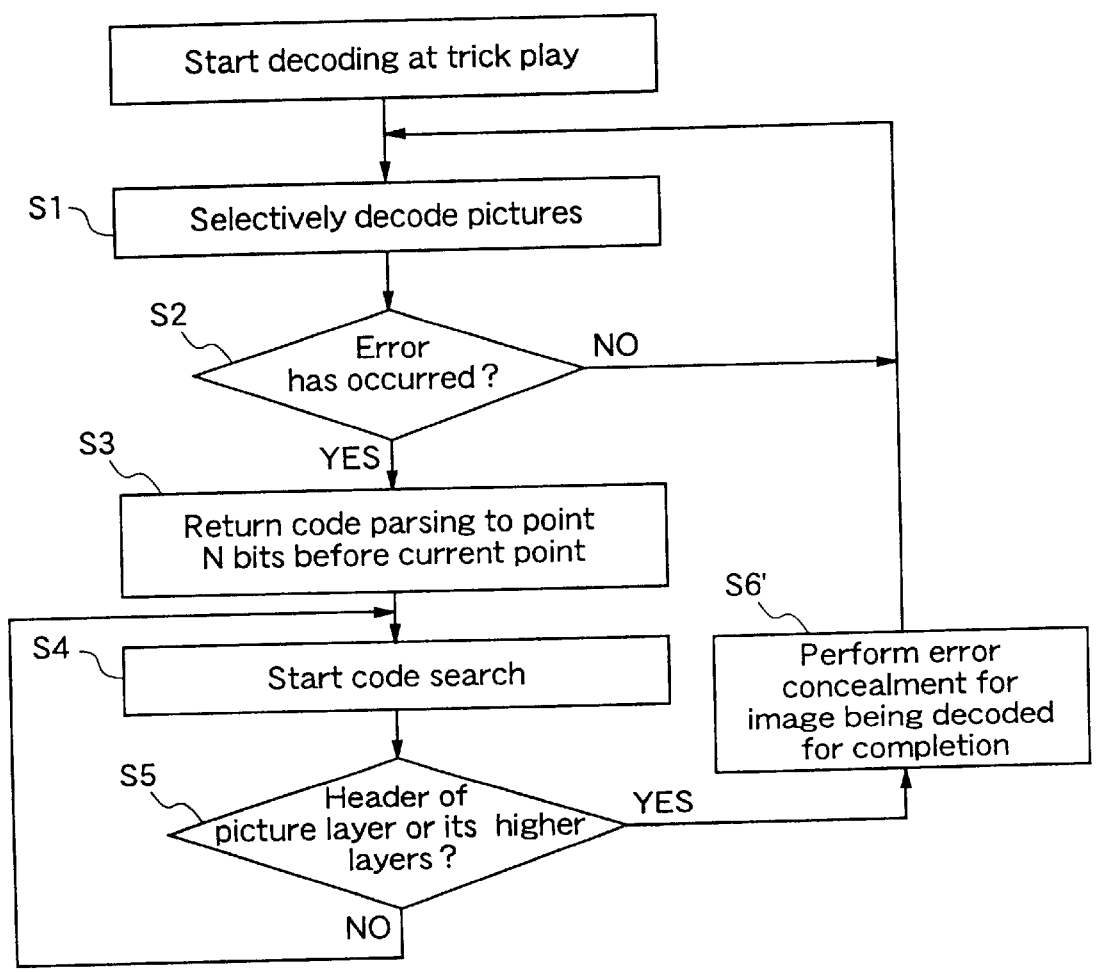
FIG. 4 is a flowchart showing a decoding method of the second embodiment.

FIG. 4 shows a flowchart showing operation of the decoding apparatus 100a. As in the Steps (S1–S4) performed by the decoding apparatus 100, when the error has occurred in the elementary stream supplied at the fast forward playback process, code sequence parsing is returned to a point N bits before the current point where decoding is being performed and the start code of the picture layer and its higher layers is searched by the variable length decoder 11.

The variable length decoder 11 searches the start code (Step S4). When the found code indicates the header of the picture layer or its higher layers (Step S5), the decoder 12a performs the error concealment process for an image region of an I picture being decoded, which has been lost due to the error, followed by image display (Step S6'). On the other hand, when the found start code does not indicate the header of the picture layer or its higher layers, the search for the start code is repeated until the header of the picture layer or its higher layers is searched.

Thus, in accordance with the second embodiment, the error of code parsing occurred at the connection point of the parts of the bitstream composing the elementary stream is detected, the start code of the picture layer and its higher layers before the point where decoding is being performed is searched, and then the data of the picture layer and its higher layers is decoded and the image where the error has occurred is subjected to the error concealment process and then decoded. Therefore, serious degradation in the quality of the image can be avoided and simultaneously, the elementary stream supplied to the decoding apparatus can be decoded correctly.

While in the above embodiments, the I pictures are selectively decoded at the trick play process including the fast forward playback process and the fast rewind playback process, alternatively, the I pictures and the P pictures may be decoded and displayed, or pictures of all types selected suitable may be decoded and displayed.

In addition, the present invention is applicable to a decoding method which adopts MPEG2 or H.261 (Video Code for Audiovisual services at p×64 kb/s (CCITT Recommendation H.261)).

Moreover, while the digital moving picture is decoded in the illustrated examples of the above embodiments, the present invention is also applicable to decoding and reproduction processes for a digital audio signal and a data signal represented as a variable length code.

What is claimed is:

1. A decoding apparatus comprising:

decoding means which receives a first code sequence of a hierarchical structure as an input, decodes a code sequence of a selected first layer and higher layers in the first code sequence, outputs a detection signal when an error is detected while the code sequence is being decoded, and detects a second code sequence indicating the start of the first layer and higher layers in a set code sequence parsing position of the first code sequence; and means for setting a code sequence parsing position which receives the detection signal and sets the parsing position of the code sequence in such a way that code sequence parsing performed by the decoding means is returned from a point where code sequence parsing is being performed to a point where code sequence parsing has been performed in the first code sequence.

2. The decoding apparatus of claim 1 wherein the decoding means nullifies decoded data of the first layer being decoded and lower layers, after detecting the second code sequence.

3. The decoding apparatus of claim 1 wherein the decoding means, after detecting the second code sequence, performs a predetermined process for data which is being decoded and will be obtained by decoding a code sequence of a layer lower than the first layer which will appear in the first code sequence, based on decoded data, in order to complete data of the layer lower than the first layer.

4. A decoding method comprising:

a decoding step which receives a first code sequence of a hierarchical structure as an input, and decodes a code sequence of a selected first layer and higher layers in the first code sequence, wherein a parsing position of a code sequence is set in such a way that code sequence parsing is returned from a point where code sequence parsing is being performed to a point where code sequence parsing has been performed in the first code sequence, and a second code sequence indicating the start of the first layer and higher layers is detected in the set parsing position of the first code sequence, when the error is detected while the code sequence is being decoded.

5. The decoding method of claim 4 wherein the decoding step nullifies decoded data of the first layer being decoded and lower layers, after detecting the second code sequence.

6. The decoding method of claim 4 wherein the decoding step, after detecting the second code sequence, performs a predetermined process for data which is being decoded and will be obtained by decoding a code sequence of a layer lower than the first layer which will appear in the first code sequence, based on decoded data, in order to complete data of the layer lower than the first layer.

* * * * *